US011025882B2

(12) United States Patent
Juang et al.

(10) Patent No.: US 11,025,882 B2
(45) Date of Patent: Jun. 1, 2021

(54) LIVE ACTION VOLUMETRIC VIDEO COMPRESSION/DECOMPRESSION AND PLAYBACK

(71) Applicant: HypeVR, San Diego, CA (US)

(72) Inventors: Jason Juang, San Diego, CA (US); Anthony Tran, San Diego, CA (US); Jiang Lan, San Diego, CA (US); Caoyang Jiang, San Diego, CA (US)

(73) Assignee: HypeVR, San Diego, CA (US)

(*) Notice: Subject to any disclaimer, the term of this patent is extended or adjusted under 35 U.S.C. 154(b) by 380 days.

(21) Appl. No.: 15/495,863

(22) Filed: Apr. 24, 2017

(65) Prior Publication Data
US 2017/0310945 A1 Oct. 26, 2017

Related U.S. Application Data

(60) Provisional application No. 62/327,331, filed on Apr. 25, 2016.

(51) Int. Cl.
*H04N 13/00* (2018.01)
*H04N 13/161* (2018.01)
(Continued)

(52) U.S. Cl.
CPC ........... *H04N 13/161* (2018.05); *G01S 17/86* (2020.01); *G06T 7/40* (2013.01); *G06T 7/593* (2017.01);
(Continued)

(58) Field of Classification Search
CPC ............. H04N 13/0048; H04N 13/004; H04N 13/0239; H04N 13/0051; H04N 13/0037;
(Continued)

(56) References Cited

U.S. PATENT DOCUMENTS 5,714,997 A * 2/1998 Anderson ............ G02B 27/017
348/39
6,268,862 B1 * 7/2001 Uchiyama ............... G06T 15/10
345/419
(Continued)

OTHER PUBLICATIONS

World Intellectual Property Office, International Search Report and Written Opinion for International Application No. PCT/US2017/029261, dated Jul. 17, 2017, 13 total pages.

*Primary Examiner* — Shawn S An
(74) *Attorney, Agent, or Firm* — SoCal IP Law Group LLP; Jonathan Pearce

(57) ABSTRACT

A method for compressing geometric data and video is disclosed. The method includes receiving video and associated geometric data for a physical location, generating a background video from the video, and generating background geometric data for the geometric data outside of a predetermined distance from a capture point for the video as a skybox sphere at a non-parallax distance. The method further includes generating a geometric shape for a first detected object within the predetermined distance from the capture point from the geometric data, generating shape textures for the geometric shape from the video, and encoding the background video and shape textures as compressed video along with the geometric shape and the background geometric data as encoded volumetric video.

18 Claims, 12 Drawing Sheets

(51) Int. Cl.

| | | |
|---|---|---|
| *H04N 13/144* | (2018.01) | |
| *H04N 13/15* | (2018.01) | |
| *H04N 13/156* | (2018.01) | |
| *H04N 13/167* | (2018.01) | |
| *H04N 13/189* | (2018.01) | |
| *H04N 13/254* | (2018.01) | |
| *H04N 13/243* | (2018.01) | |
| *G01S 17/86* | (2020.01) | |
| *G06T 7/593* | (2017.01) | |
| *G06T 7/40* | (2017.01) | |
| *G06T 7/60* | (2017.01) | |
| *G06T 19/00* | (2011.01) | |

(52) U.S. Cl.
CPC .............. *G06T 7/60* (2013.01); *G06T 19/006* (2013.01); *H04N 13/144* (2018.05); *H04N 13/15* (2018.05); *H04N 13/156* (2018.05); *H04N 13/167* (2018.05); *H04N 13/189* (2018.05); *H04N 13/243* (2018.05); *H04N 13/254* (2018.05); *G06T 2200/04* (2013.01); *H04N 2013/0077* (2013.01); *H04N 2013/0081* (2013.01); *H04N 2013/0096* (2013.01); *H04N 2213/002* (2013.01)

(58) Field of Classification Search
CPC ......... H04N 13/0033; G06T 7/40; G06T 7/60; G06T 19/006; G01S 17/023
See application file for complete search history.

(56) References Cited

U.S. PATENT DOCUMENTS

| | | | |
|---|---|---|---|
| 6,999,093 B1* | 2/2006 | Wetzel | G06T 15/04 |
| | | | 345/428 |
| 8,016,653 B2 | 9/2011 | Pendleton et al. | |
| 9,329,469 B2* | 5/2016 | Benko | G03B 35/00 |
| 9,369,689 B1* | 6/2016 | Tran | G06T 7/593 |
| 2007/0279415 A1* | 12/2007 | Sullivan | H04N 13/275 |
| | | | 345/427 |
| 2008/0246759 A1 | 10/2008 | Summers et al. | |
| 2008/0260045 A1 | 10/2008 | Rodriguez et al. | |
| 2010/0074532 A1* | 3/2010 | Gordon | G06T 7/536 |
| | | | 382/203 |
| 2011/0122224 A1 | 5/2011 | Lou | |
| 2012/0120200 A1 | 5/2012 | Newton et al. | |
| 2012/0200867 A1* | 8/2012 | Fujita | H04N 1/6033 |
| | | | 358/1.9 |
| 2013/0300838 A1 | 11/2013 | Borowski et al. | |
| 2015/0146267 A1* | 5/2015 | Miller | H04N 1/00721 |
| | | | 358/464 |
| 2015/0220158 A1* | 8/2015 | Elangovan | G06F 1/163 |
| | | | 345/156 |

* cited by examiner

LIVE ACTION VOLUMETRIC VIDEO COMPRESSION/DECOMPRESSION AND PLAYBACK

RELATED APPLICATION INFORMATION

This patent claims priority from U.S. provisional patent application No. 63/327,331 entitled "Live Action XYZ Video Codec and Graphics Engine Playback for 6-DOF Virtual Reality" filed Apr. 25, 2016.

This patent is related to U.S. patent application Ser. No. 15/385,181 filed on Dec. 20, 2016 entitled "Lidar Stereo Fusion Live Action 3D Model Video Reconstruction for Six Degrees of Freedom 360° Volumetric Virtual Reality Video" which is a continuation of patent application Ser. No. 15/139,183 filed on Apr. 26, 2016 entitled "Lidar Stereo Fusion Live Action 3D Model Video Reconstruction for Six Degrees of Freedom 360° Volumetric Virtual Reality Video", which is a continuation of patent application Ser. No. 15/047,525 filed Feb. 18, 2016, now U.S. Pat. No. 9,369,689 issued Jun. 14, 2016 entitled "Lidar Stereo Fusion Live Action 3D Model Video Reconstruction for Six Degrees of Freedom 360° Volumetric Virtual Reality Video", which claims priority from U.S. provisional patent application No. 62/119,821 entitled "Lidar Assisted 3d Depth Based Image Stitching Method for Seamless Stereo Panoramic 360 Degree images and Video" filed Feb. 24, 2015 and from U.S. provisional patent application No. 62/202,916 entitled "Lidar Stereo Fusion Live Action 3d Model Video Reconstruction for 6-DOF Virtual Reality" filed Aug. 10, 2015. The entirety of each of these applications is incorporated by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to live action three-dimensional volumetric video compression, decompression and playback. More specifically, the disclosure describes the combination of live-action stereoscopic video and LIDAR to generate a detailed set of three-dimensional data from which three-dimensional volumetric video may be created along with the methods employed in compressing that three-dimensional volumetric video in such a way that it may be transmitted, decompressed, and presented on a virtual reality or augmented reality headset.

Description of the Related Art

The other patent applications and patents identified above discuss the capability to capture high-quality computer images of live-action three-dimensional scenes using a set of stereoscopic cameras and a LIDAR along with the capability to convert the associated data into a detailed three-dimensional model of the captured environment with appropriate textures and/or video. However, as can be imagined, these processes and systems generate extremely large sets of data for even short live-action three-dimensional volumetric video.

This type of data cannot easily be transported using fixed media, much less streamed using the internet, or downloaded. The video being captured is so-called "4K" video or better on each of the stereoscopic camera rigs (of which there may be anywhere from 1 to 16 or more sets of cameras). Moreover, the three-dimensional data encompasses an entire environment from the camera rigs and LIDAR location, for each frame of video, and in all directions. In contrast, traditional computer games or virtual environments typically provide only a single screen (point of view for an environment) and those aspects of the environment that are not currently visible in that view point need not be rendered or even considered in any calculations.

As used herein "stereo camera" or "stereoscopic camera" means a camera or set of cameras with two or more lenses. Because the relative distance between the focal point of the two lenses may be measured, images of the same scene may be captured using a stereo camera and, thereafter, three-dimensional characteristics for the image may be calculated based upon that relative distance.

A typical single frame of the type of live action, three-dimensional volumetric video in native format can be up to three gigabytes of data. At 24 or 30 or 60 frames per second (fps), the data rate to stream such data must be upwards of 72 or 90 or 180 gigabytes per second. Likewise, even a 2-minute video (120 seconds @24 fp) is 8,640 gigabytes. Using current technologies, these data rates and storage capacities are extremely technologically and cost prohibitive for a typical consumer-grade computer system. Obviously, technology will advance and prices will come down, but in the meantime, providing this technology to the masses proves difficult.

In order to enable storage and transmission of the captured data in an intelligent and cost-effective fashion, a compression and decompression algorithm that significantly reduces the complexity of the captured data with minimal negative impact on the quality of the playback to an end-viewer of the content is desirable.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
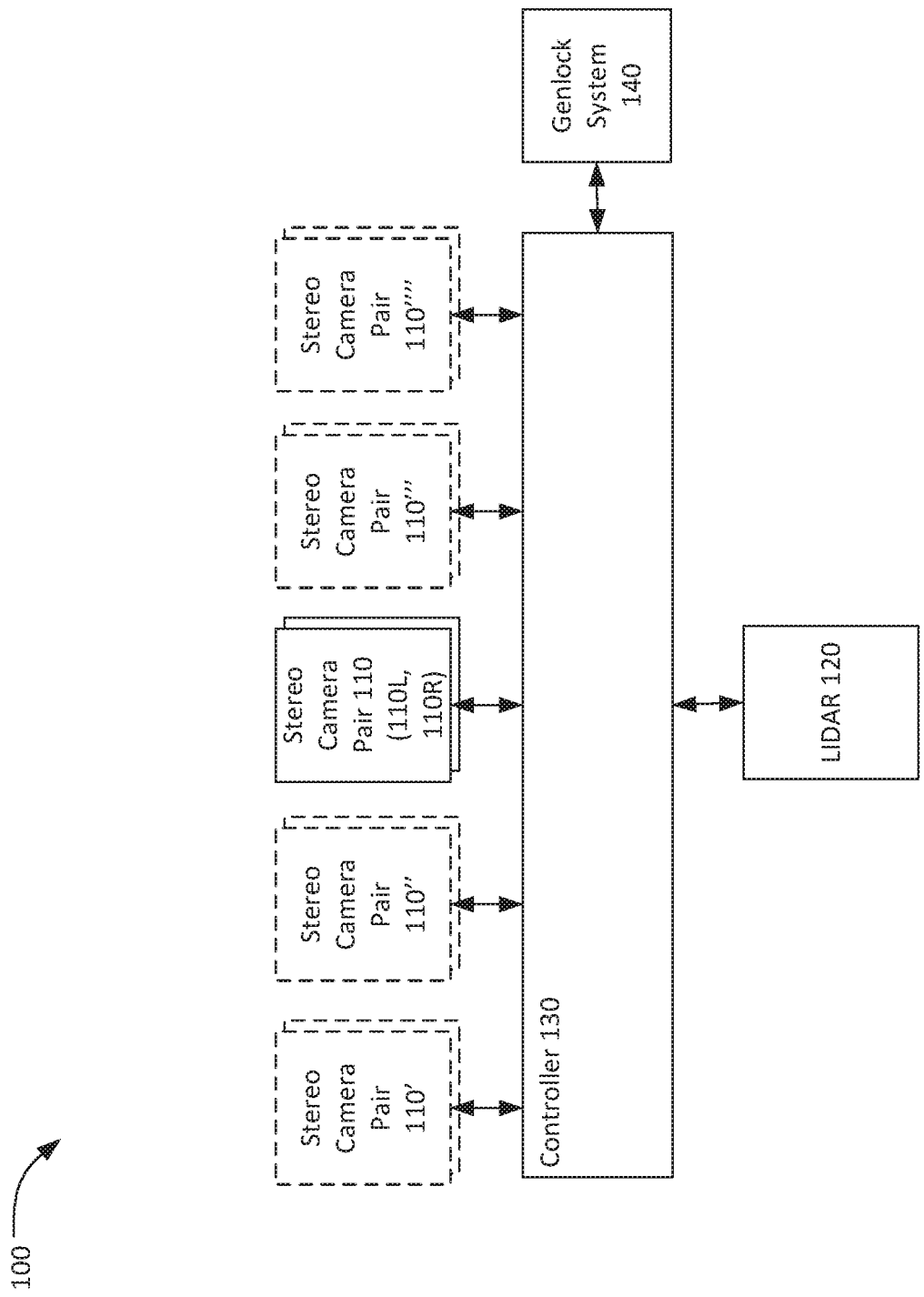
FIG. 1 is a block diagram of a system for fusion of stereographic images and LIDAR.

Referring now to FIG. 1 is a block diagram of a system 100 for fusion of stereographic images and LIDAR. The system 100 includes at least one stereo camera pair 110, made up of 110L, 110R (with 110L being a left camera and 110R being a right camera). There may be a one or more additional stereo camera pairs, such as stereo camera pairs 110', 110'', 110''', and 110''''. The stereo camera pair 110 may be used to create stereo images from which three-dimensional camera data may be derived. As used herein "three-dimensional camera data" means three-dimensional data that is derived from simultaneous images captured by a stereo camera pair.

The LIDAR 120 is a depth sensing technology that relies upon at least one laser and the detection of reflections from that at least one laser to generate depth maps for three-dimensional spaces. There are various embodiments of LIDARs. Some use a single, scanning laser that moves across a field of view, others rely upon multiple discrete beams that move across individual fields of view. Still others use beam splitters or similar technologies to simultaneously scan multiple areas with a single discrete laser. The number of independent sensors for reflected beams may also vary from one to many. Less-expensive, modern LIDARs typically rely upon a combination of optics and one large sensor to collect reflected beams and to, thereby, derive data. Preferably, three-dimensional data generated by a LIDAR is in the form of an (X,Y,Z) point field, relative to the LIDAR. As used herein the phrase "three-dimensional LIDAR data" means three-dimensional data captured or derived from three-dimensional data generated by a LIDAR.

Both the stereo camera pair 110 and the LIDAR 120 operate at the direction of a controller 130. The controller 130 may be in whole or in part a general-purpose computing device. Though shown as a single controller 130, multiple independent controllers may interact, for example, an individual controller for the LIDAR and another for one or more stereo camera pairs. The controller 130 orchestrates interactions between each of the stereo camera pairs (e.g. stereo camera pair 110) and the LIDAR 120. The controller 110 may merely capture and store camera and LIDAR data that may later be used to create three-dimensional data describing a target three-dimensional environment. Alternatively, the controller 110 may act to capture, store, and to thereafter perform calculations suitable to generate three-dimensional data describing a target three-dimensional environment.

The controller 130 may be in communication with or include a generator locking system 140. Generator locking (genlock) is a system or device that is used to synchronize sources of time-based material such as audio or video. Here, with multiple pairs of stereo cameras 110 and LIDAR 120, each independently generating content, the genlock system 140 provides a single-source timestamp on each set of data (images or LIDAR data) generated so that it may be accurately synchronized as it is combined by the controller 130. Preferably, the genlock system 140 may be a global positioning system (GPS) receiver with access to or receipt of extremely accurate time data. However, other methods and systems for performing genlock are known in the art.

As used herein, the phrase "three-dimensional data" means data including depth information, relative to at known position, sufficient to generate a three-dimensional scene corresponding to a three-dimensional space around the location from which the data used to generate the three-dimensional data was captured.

Figure 2:
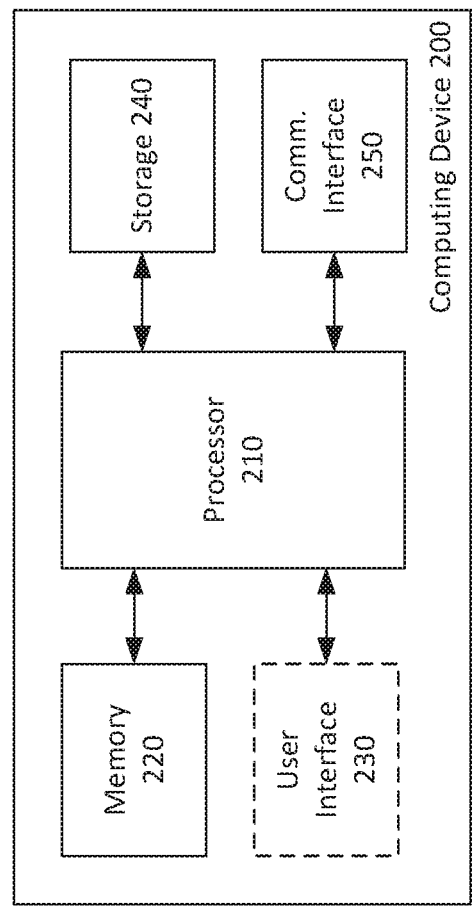
FIG. 2 is a block diagram of a computing device.

Turning now to FIG. 2, is a block diagram of an exemplary computing device 200, which may be the controller 130 of FIG. 1. As shown in FIG. 2, the computing device 200 includes a processor 210, memory 220, optionally, a user interface 230, storage 240, and a communications interface 250. Some of these elements may or may not be present, depending on the implementation. Further, although these elements are shown independently of one another, each may, in some cases, be integrated into another.

The processor 210 may be or include one or more microprocessors, microcontrollers, digital signal processors, application specific integrated circuits (ASICs), or a system-on-a-chip (SOCs). The memory 220 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 220 may store software programs and routines for execution by the processor. These stored software programs may include an operating system software. The operating system may include functions to support the communications interface 250, such as protocol stacks, coding/decoding, compression/decompression, and encryption/decryption. The stored software programs may include an application or "app" to cause the computing device to perform portions of the processes and functions described herein. The word "memory", as used herein, explicitly excludes propagating waveforms and transitory signals.

The user interface 230, if present, may include a display and one or more input devices such as a touch screen, keypad, keyboard, stylus or other input devices.

Storage 240 may be or include non-volatile memory such as hard disk drives, flash memory devices designed for long-term storage, writable media, and proprietary storage media, such as media designed for long-term storage of photographic or video data (as used in conjunction with cameras, like the stereo camera pair 110).

The communications interface 250 may include one or more wired interfaces (e.g. a universal serial bus (USB), high definition multimedia interface (HDMI)), one or more connectors for storage devices such as hard disk drives, flash drives, or proprietary storage solutions. The communications interface 250 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. When the computing device 200 is deployed as part of a camera and LIDAR rig, such as the system 100, a wireless PAN interface may be used to communicate with the active acoustic filter devices 110L, 110R. The cellular telephone network interface and/or the wireless LAN interface may be used to communicate with devices external to the computing device 200.

The communications interface 250 may include radio-frequency circuits, analog circuits, digital circuits, one or more antennas, and other hardware, firmware, and software necessary for communicating with external devices. The communications interface 250 may include one or more specialized processors to perform functions such as coding/decoding, compression/decompression, and encryption/decryption as necessary for communicating with external devices using selected communications protocols. The communications interface 250 may rely on the processor 210 to perform some or all of these function in whole or in part.

As discussed above, the computing device 200 may be configured to perform geo-location, which is to say to determine its own location. Geo-location may be performed by a component of the computing device 200 itself or through interaction with an external device suitable for such a purpose. Geo-location may be performed, for example, using a Global Positioning System (GPS) receiver or by some other method.

Figure 3:
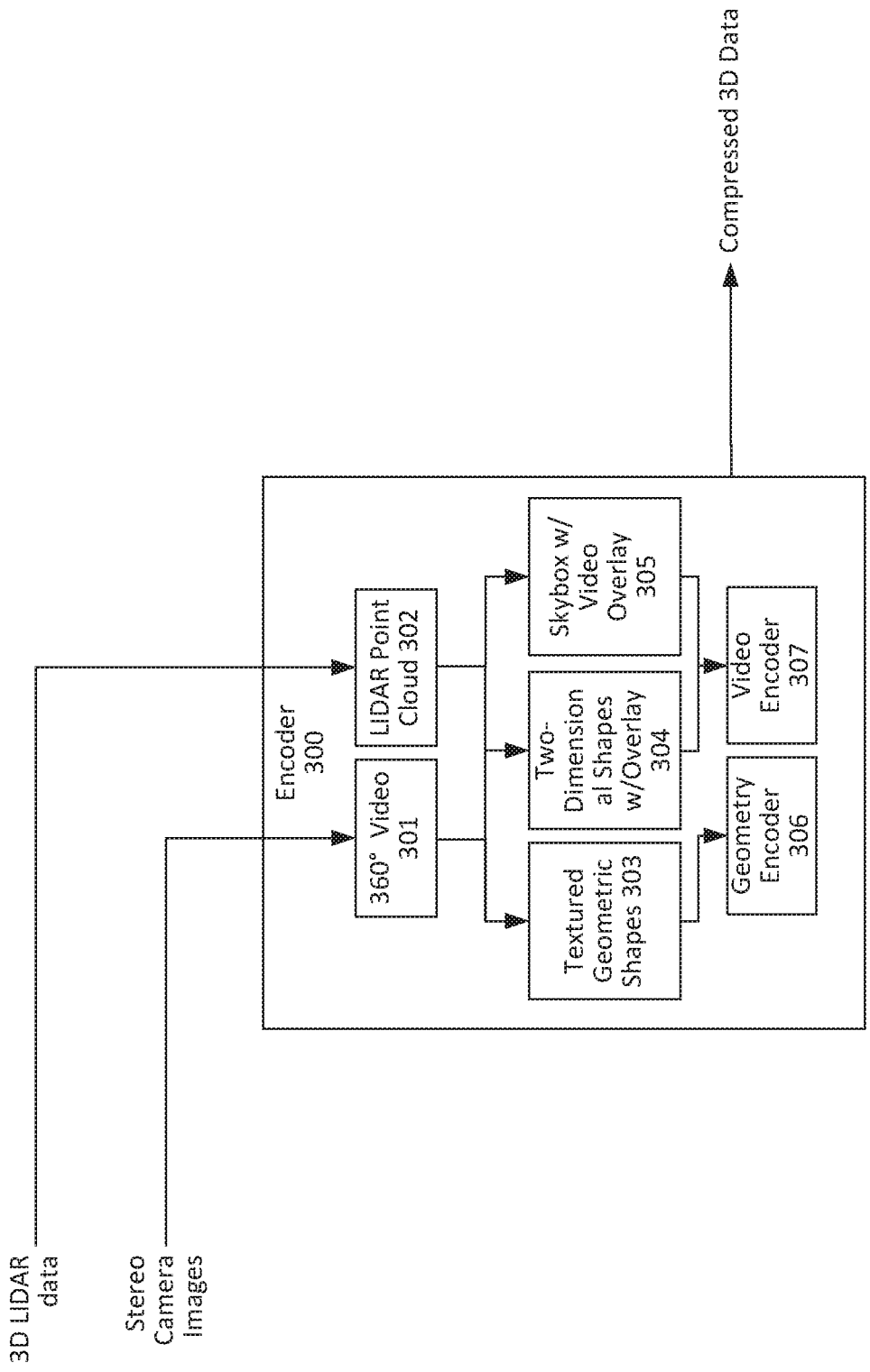
FIG. 3 is a functional block diagram of a encoder for live action volumetric video encoding.

FIG. 3 is a functional block diagram of a controller for live action volumetric video encoding. This functional block diagram may take place in whole or in part on the controller 130 or another computing device, such as a computing device with access to all of the associated camera data captured for a particular live action volumetric scene that has been captured.

First, the LIDAR and stereoscopic camera rig (e.g. FIG. 1) captures 3D LIDAR data and at least one set of stereo camera data. This may be captured by the system 100 of FIG. 1 and may or may not be joined into any cohesive whole before it passes to the encoder 300. The received stereo camera images may be projected into a 360° video 301. The 360° video 301 is a tiled and corrected version of the output of each of the stereo camera pairs. The 360° video 301 may be thought of as a spherical projection of two pi steradians of projected images with the capturing camera rig at its center. Techniques suitable for stitching together the resulting images in a frame-by-frame basis to form a spherical 360° video 301 are known. Although discussed as 360 degree video 301, it should be understood that it is spherical and is made up of two pi steradians (though portions of the sphere below the surface of the projected earth or ground may not be encoded or rendered.

Likewise, the 3D LIDAR data is projected into a LIDAR point cloud at 302 and overlaid onto the 360° video 301. The LIDAR point cloud 302 is a set of individual points with measured distances from the LIDAR that provide sparse, but very accurate depth data for a scene. As discussed in the related applications identified above, the 360° video 301 and the LIDAR point cloud 302 may be combined in such a way as to determine the three-dimensional geometry and associated textures for each object within the field of view that has any three-dimensional characteristics. This results in a set of 360°, six degrees of freedom, volumetric video. However, as discussed above, the resulting volumetric video has an enormous size given current technology. Accordingly, efficient encoding of this volume of data is desirable for storage and transmission purposes.

Once the raw geometric and visual data made up of the captured 360° video 301 and the LIDAR point cloud 302 is combined (hereinafter called the "raw volumetric video"), the encoder can take advantage of several aspects of human visual perception and of computing efficiencies to encode the data in such a way as to dramatically reduce its size.

Though discussed herein in relation to a preferred system including stereoscopic cameras and at least one LIDAR for generating two sources of geometric data along with baseline visual data (e.g. the images of the scene), the present system and methods are equally applicable to geometric data and/or visual data captured for a scene or created in a scene through any number of systems or methods. For example, three-dimensional data captured using short-range infrared systems such as the Microsoft® Kinect® may be encoded and decoded using the same types of systems and methods described herein. Likewise, traditional video game data such as a virtual environment made up of geometric shapes and associated graphics may be encoded and decoded using the systems and methods described herein. Geometric data generated from stereographic cameras alone may be treated similarly. In short, if one has access to geometric data for a given environment of virtually any type, that geometric data may be encoded and decoded using the systems and methods described herein.

As used herein, the phrase "geometric data" means data defining three-dimensional characteristics of a scene with a known central point, however captured or created. For simplicity, the use of stereographic camera data and a LIDAR point cloud are referred to throughout herein because it has been found that these systems are robust for live-action scenes while not requiring substantial setup time for those scenes unlike some other prior art systems.

The raw volumetric video is divided into three regions. The first region includes "close" objects, the second region includes "intermediate" objects, and the third region includes "distant" objects. These regions are determined based upon their relative distance from the capture point (e.g. the camera/LIDAR rig).

In general, the "close" objects are those objects within approximately 5-10 meters from the capture point. Likewise, in general, "intermediate" objects are objects between 10-20 meters from the capture point. Finally, generally, "distant" objects are objects greater than 20 meters from the capture point. These distances may be set by a user preference for the user of the encoder or may be hard-coded. Though the distances are given as ranges here, they are preferably set at a particular distance such as up to 7 meters for the "close" objects, between 7-20 meters for the "intermediate" objects, and with anything greater than 20 meters being "distant" objects. The distances for each region also may be adjusted according to the capabilities of current technologies or other characteristics.

Still further alternatively, different methodologies for selecting which geometry in a scene to create as either "close," "intermediate," or "distant" objects may be used. For example, the determination between "intermediate" objects and "close" objects may include consideration of the overall variability of distances for a single object. Any object other than a "skybox" distant object (for example at a distance greater than 100 meters from a capture point) may be evaluated to determine if it exhibits a large degree of variability of depths visible to a camera. For example, an individual standing within a scene at a medium distance may be holding his or her arm in such a way as to point away from or toward a camera at the capture point. That arm may be up to a meter closer or further from the camera than the rest of that individual's body. Presenting that individual as a "card" at an intermediate distance would result in a significant visual degradation of quality. Specifically, a viewer, even at a relatively great distance, would be able to tell that the "card" had no arm projecting either toward or away from the camera and would notice the unusual geometry while viewing the scene. In such cases, these objects that could potentially be encoded as a "card" are preferably fully-realized as geometric shapes with associated textures because to not do so would result in a significantly less-real scene.

The test for determining whether or not there is a visually-perceivable distinction between a "card" presentation of an object or a geometric presentation as a geometric shape is whether or not there is a one-pixel difference between the projections of visually-perceived native volumetric video and the encoded volumetric video for that object (or the perceived geometry re-created as a set of tessellations). A card that substantially accurately represents its subject object does not have any (or very few) pixel-differences from the native volumetric video representation, whereas a card that would be perceived as visually lacking has at least one pixel difference, from a viewer's perspective, from that native representation in the volumetric video. Beneficially, this distinction is relatively easy for a computer to detect. Pixel differences are relatively easy for software to identify, and "cards" that have this characteristic may be replaced with fully-realized geometric shapes in order to retain fidelity. Though a single pixel difference is discussed herein as the standard to retain extremely high visual fidelity in the encoding. In less-demanding situations or in cases in which higher compression is desirable, a broader range of differences may be acceptable, depending on the implementation.

Given that one of the determinations above is where a single pixel would be different between a pre-encoding and a post-encoding version of an otherwise "card" object, the overall resolution of the expected rendering may also be taken into consideration. In low-resolution displays, a viewer is much less likely to notice relatively insignificant differences in pixels. But, in the ideal high-resolution at or near the capture resolution, even single pixel differences may result in dramatic visual perception differences.

In contrast, a poster or painting hanging on a nearby wall is "close" within the ranges discussed above, but its characteristics are such that it has no depth. In such cases, objects that would otherwise be characterized as "close" and that would require full geometric shapes and associated textures may comfortably be represented as merely a "card," typically reserved for objects more distant from a viewer. Presenting an entire wall or a flat object like a poster or painting on a wall as a "card" will have no perceivable degradation to the overall scene So, although these characteristics were generalized under the other method as "close," "intermediate," and "distant" objects; the ultimate determination here is whether the objects have overall characteristics that would remain accurately represented by a "card" in place of a geometric shape.

Returning to our example, once the raw volumetric video is obtained and the content is divided into regions, it is operated upon differently by the encoder depending on its relative distance. "Close" objects are fully 3D rendered based upon the raw volumetric video to create textured geometric shapes at 303. These textured geometric shapes are like the actual captured object that is "close" as is possible for those shapes. This is accomplished using a relatively standard geometry encoder 306 of a type that is used by virtual reality content creators to create virtual reality or three-dimensional environments. The encoding creates "geometry" or "geometric shapes" that, as used herein, are a three-dimensional representation of the identified three-dimensional object. The associated textures, drawn from the captured image data in the raw volumetric video, may be used to "wrap" the geometry in such a way that it appears just as it does when captured. These textures may be reduced in complexity or otherwise compressed according to known techniques, but the resulting object or objects within that "close" range appear as fully-realized three-dimensional objects within the environment. They are encoded in such a way to make this possible. This does not produce much overall reduction in the complexity or size as compared with the associated raw volumetric video.

The "intermediate" objects are instead reduced to a two-dimensional shapes (e.g. a square or rectangle) with a textural overlay 304. The two-dimensional square or rectangle is projected into the environment at a determined distance from the capture point. For example, this two-dimensional square or rectangle may be projected at an average distance of an identified three-dimensional object in whose place the two-dimensional square or rectangle is standing. As used herein, the word "card" is used to describe these two-dimensional shapes because they take the form of a "card" within the three-dimensional environment.

So, for example, for an individual person at an intermediate distance in a scene, a taller-than-wide rectangle may be projected in place of the three-dimensional object that was captured by the stereoscopic camera rig and LIDAR data. The human body obviously has projections and indentations (e.g. a human nose sticks out relative to the rest of a face or body and the ears on the mid-side of a human head, set back from the front of the face or body). Thus, an average distance somewhere approximately the same distance as a human chin or neck may be selected as the relevant distance for the two-dimensional projection.

As can be understood, this two-dimensional projection has a number of benefits over a fully-rendered and textured three-dimensional object used for "close" objects. First, the two-dimensional object may be encoded as a set of (x, y, z) coordinates and associated lengths and widths at that projected distance. This object may, in fact, "curve" so as to match the overall spherical environment created by the skybox projection (discussed below), but otherwise may be "flat" relative to the background.

Second, the two-dimensional projection may be textured with a single video frame, almost directly as captured by the camera rig. No three-dimensional processing or associated data is necessary. In essence, the three-dimensional objects at this "intermediate" distance may be approximated by the two-dimensional square or rectangular projection at the average distance or some other predetermined distance. As discussed more fully below, this type of projection enables the encoder to rely upon excellent techniques for the compression of video for storage and transmission.

One issue presents itself in the form that, returning to our example above, even a "flattened" version of a human body is not actually a longer-than-wide rectangle. In fact, the human body is a complex geometry along its edges. For example, ears and hair project out in odd angles, Arms, elbows, feet, knees, and the like have curves, angles, and may product unusual shapes for geometry.

However, as discussed above, squares and rectangles are desirable because their representation (and the necessary storage and data associated therewith) is relatively small in comparison to three-dimensional geometry, especially geometry with textures on each face of that geometry. So, in order to address the issues associated with representing complex three-dimensional objects as mere squares or rectangles, the associated square or rectangle may be presented as a frame of two-dimensional video "fit" on a floating square or rectangular "screen" within the three-dimensional space, but with associated alpha (a) (also called transparency) for regions of the two-dimensional square or rectangle that are not a part of the object being represented (e.g. the person). So, the entire square or rectangle may be encoded within the three-dimensional geometry and the entire video frame maybe encoded as video (discussed below), but the regions that are not the object to be represented may be made completely transparent within that associated video.

This serves several beneficial purposes. First, portions of the associated video that are flagged as "transparent" need only be represented by a single bit identifying those regions as invisible. This saves space in storage. Second, these transparent portions, from frame to frame, using traditional video encoding techniques need not be updated so long as their content does not change from frame to frame. So, from frame to frame of video, if those portions remain transparent, the encoding of those regions is extremely efficient, saving still more space in the overall encoded (compressed) 3D data.

The encoder 300 has been designed in this way in part reliant upon human capability to distinguish between textures and three-dimensional geometry at those intermediate distances. For example, at a distance of approximately 7 meters, the human eye, perceiving within a virtual environment including three-dimensional objects, cannot differentiate meaningfully between a flat object suitable textured and an actual three-dimensionally-rendered object suitably textured. The human mind "creates" appropriate shapes from a two-dimensional object based upon the shadows and overall texture of an appropriately textured object. This effect may be seen in the context of facial makeup applied in certain contexts. Used correctly (e.g. in film), makeup with appropriate shading or accents may cause one's eyes to perceive more depth or texture than is actually there. For example, women often have darker shading below their cheekbones to give the appearance of more prominent cheekbones. The use of two-dimensional, but textured video at "intermediate" depths relies upon similar limitations in human visual perception.

Finally, those objects that are "distant" objects are projected as a "skybox" of stitched video overlay 305. The term skybox is a term used in game development to indicate an "infinite" distance from the player's avatar. It has been imported into the virtual reality environment with similar meaning. A skybox may have a background texture (e.g. stars or a blue sky) projected onto it because to a viewer in the avatar's position, that distance is the sky. The distance is not literally infinite, but it is beyond the parallax distance (e.g. the distance at which a user can perceive three-dimensionality of an object).

Because the range of motion within the fully-realized six degrees of freedom volumetric video is relatively small, the distance at which parallax can be detected is relatively close (approximately 22 meters). As used herein, the term "non-parallax distance" means a distance at which parallax can no longer be detected. So, objects that are beyond that predetermined distance may all be presented as three-dimensional video projected onto a spherical "skybox" at a predetermined distance from the viewer's position. Like the texturing used for the "intermediate" objects, the appropriate texturing and shadows from the video itself are sufficient to convince a viewer that the scene is three-dimensional—particularly when there are "close" three-dimensional objects that are fully-rendered as geometric shapes and there are "intermediate" objects that appear to that person's eyes to be three-dimensional.

Now, the textured geometric shapes 303 may be encoded using a geometry encoder 306 of a type used for creating virtual reality environments or three-dimensional game environments. These engines or encoders typically operate to create a series of linked geometric shapes (e.g. triangles) that mimic the shape being created in the virtual world. If geometry is regular, very few of these shapes are necessary to create the form of an object. Fewer shapes means less complexity and smaller file sizes and faster rendering. If the geometry is irregular (e.g. a wooden, spoke-backed chair with numerous curved surfaces), then many shapes (e.g. small triangles, linked together to form the spoke-backed chair) may be necessary.

The geometry encoder may exploit the fact that the geometric shapes likewise do not change or do not change much from frame to frame of the video. For example, chairs seldom morph into trees or cars. The changes in geometry are, therefore relatively small. As may be done with video from frame-to-frame, the changes in geometry may be saved or transmitted as merely differences from a key frame for that geometry which fully describes the geometry. Periodic key frames may be inserted into videos to enable the first rendition of this geometry and the subsequent data and transmission savings enabled by use of encoding the differences rather than re-encoding the entire geometry for each frame.

On top of this geometry, an appropriate texture is superimposed. The texture is a two-dimensional image that is intended to generate the desired coloration, lighting, and texture for the scene (even if the geometry itself has no actual texture, this may be visually simulated by an image including that texture). In the case of the captured video created by the camera rigs, the coloration, lighting, and texture will be effectively perfect because reality is being captured through the 360 degree video 331. That captured texture need only be "wrapped" appropriately around the created geometry. These geometric shapes encoded by the geometry encoder 306 are the most-complex aspect of the encoder 300 and, as a result, take up the most space in storage and transmission.

For the "intermediate" and "distant" objects a relatively standard video encoder 307 may be used. These video encoders may use features of the captured video to their advantage in creating the associated compressed 3D data. For example, some encoding techniques rely upon periodic full frames (e.g. a key frame) of video wherein the color of every pixel is encoded, but the pixels between key frames are transmitted as compressed data showing only the mathematical differences from the immediately previous frame. In general, it turns out, video does not dramatically shift from frame-to-frame unless there is a scene change. So, the encoding necessary to transmit each frame after a key frame is actually relatively small. These types of techniques can dramatically reduce the overall bandwidth or storage necessary for encoding the "intermediate" and "distant" objects which are not fully-rendered three dimensional shapes, but video projected onto a shape or a skybox. Along with the actual encoded video, the shape and location of the video may be transmitted as a fixed or relative location within the overall 360 degree video.

This encoding results in the compressed 3d data that is significantly reduced in size and complexity.

Figure 4:
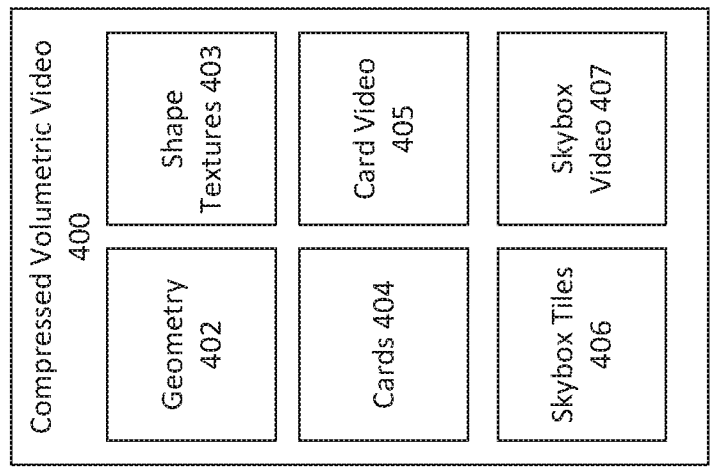
FIG. 4 is a functional block diagram of the format of compressed volumetric video.

FIG. 4 is a functional block diagram of the format of compressed volumetric video 400. The compressed volumetric video 400 is shown functionally for illustrative purposes. The elements of the compressed volumetric video

400 may be generally divided up into the three categories discussed above: "close," "intermediate," and "distant" objects.

For the "close" objects, the geometry 402 and shape textures 403 may be seen. The geometry 402 is the fully-realized three dimensional shape that best reproduces the object within the "close" predetermined region of the captured video and LIDAR data. There may be one or many geometric shapes in this "close" region. For each of those shapes, shape textures 403 are also created in which to "wrap" the geometric shape. Each face of every geometric shape created by the geometry 402 is textured with the shape textures 403.

For the "intermediate" objects, a series of cards 404—which is one way in which to describe the squares or rectangles placed at a distance from the viewer's position—are created. The cards 404 data includes the card locations, typically an (x, y, z) coordinate with the three-dimensional space, along with a width and height for the card. This data is relatively small and certainly much smaller than a full geometry 402. Along with these cards 404 is the card video 405 which is the video that will be played on each of the cards 404 for the detected object. As discussed above, portions of the card video 405 may simply be transparent so that the background may be seen through that video. Transparent video is easy to compress—it exists only as a flag of transparency for certain pixels. Again, this saves space in the compressed volumetric video 400. The card video may be compressed using video compression techniques.

Finally, the compressed volumetric video 400 includes skybox tiles 406 and skybox video 407 for the "distant" objects. For the objects beyond the "distant" predetermined distance, skybox tiles 406 are a series of tiles that together make up a sphere at a non-parallax distance from the viewer's position. The associated skybox video 407 may simply be the video captured by the cameras in compressed form using video compression techniques.

Figure 5:
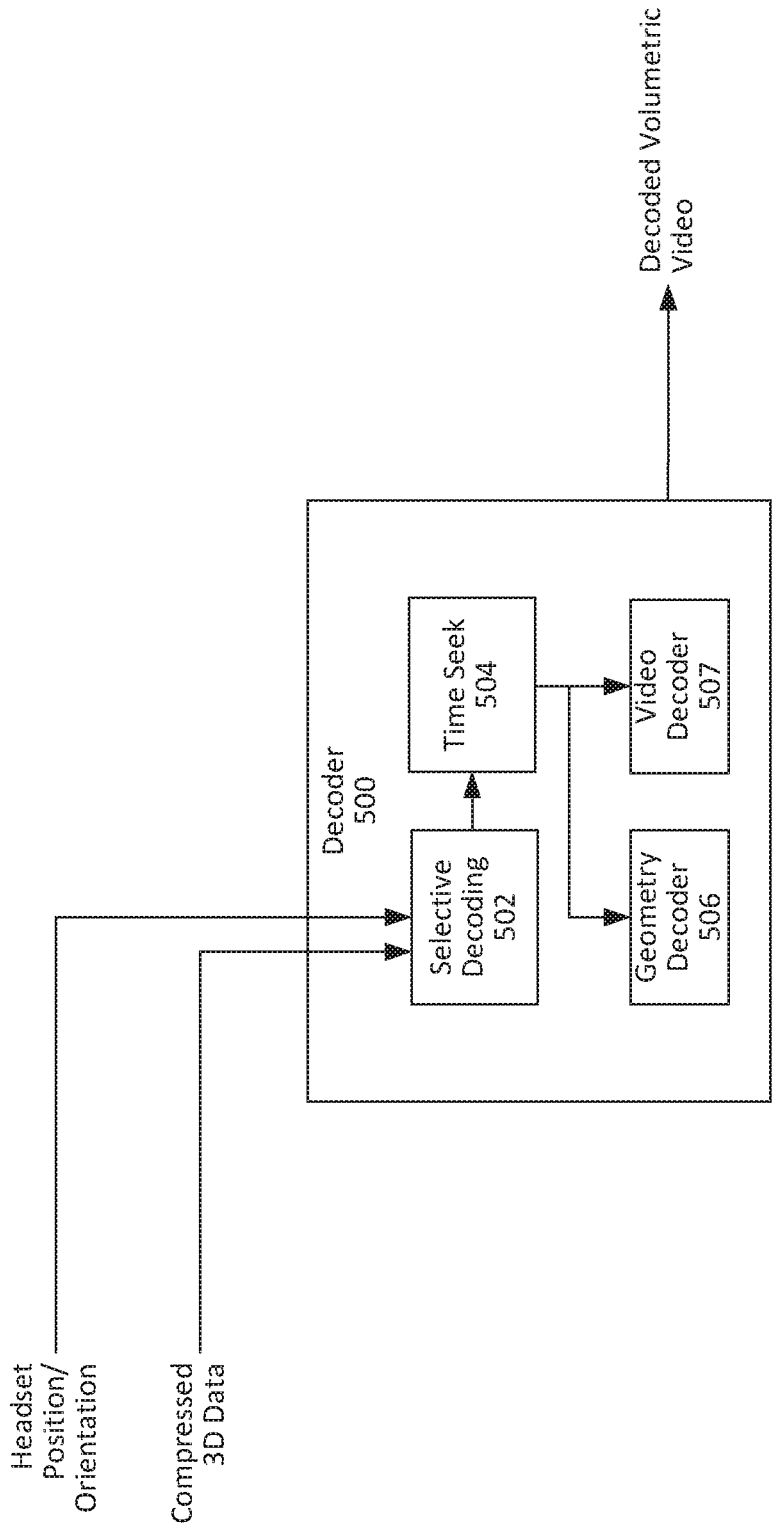
FIG. 5 is a functional block diagram of a decoder for live action volumetric video decompression.

FIG. 5 is a functional block diagram a decoder 500 for live action volumetric video decompression. The decoder 500 receives both headset position/orientation data and the compressed 3D data. The headset position/orientation data is important because it provides the field of view for a wearer of an associated virtual reality headset and because that data may be used to perform more efficient decoding of the compressed 3D data that is received.

First, the decoder 500 performs selective decoding using the headset position/orientation data. The compressed 3D data created by the encoder 300 (FIG. 3) is for an entire 360 degree space with the viewer position in its center. There is video and geometry in the compressed 3D data associated with every possible direction in which a viewer may look in that space. For example, there is ground below a viewer, there is sky above, there are objects to the left and right of a viewer, some of which have encoded geometry and some of which are sufficiently distant that they are only projected as "cards" or as a part of the overall skybox. But, each frame of the compressed 3D data includes all of this data for the entire scene.

However, only objects and video within a viewer's current field of view need be decoded for the current frame or the next frame to be shown to a viewer through the VR headset. To allow for some movement in the following frames, a slightly larger than field-of-view set of data may be decoded, but the selective decoding 502 captures the headset position/orientation data and the associated settings or capabilities for the VR headset (e.g. field of view settings and resolution) and identifies the portions of the compressed 3D data that should be decoded based upon the field of view. This initial stage of selective decoding 502 dramatically reduces the load in decoding the compressed 3D data.

Compressing the compressed 3D data may generally be allowed to take as long as necessary to perform that process adequately. Therefore, compression may take place over hours or days in some cases without any substantial impact upon subsequent viewers. In contrast, decoding takes place in real-time as a viewer is wearing a VR headset and experiencing an environment. As such, any gains in speed that may be accomplished are significant in reducing motion sickness and providing a more-realistic experience for a viewer. Selecting decoding 502 dramatically increases the speed and frees up memory and processing power within the CPU and GPU for other process.

The next aspect of the decoder 500 is the time seek 504 which enables the system to locate a desired time within the overall 360 degree video. The user may wish to start from the beginning in which case the time seek 504 may take place very quickly. However, if a user selects a different time, then the time seek 504 may fast forward to a desired time within the compressed 3D data. This may be more complex than one might expect because key frames for geometry, video, and textures that were used to reduce the size of the compressed 3D data at the encoding stage must be located. For example, if the time sought by a viewer is t+7 and the last key frame for the compressed video is at time t+1 and the last key frame for geometry is a time t+3, the time seek 504 must locate those relevant key frames, the associated differences, and then create the geometry, textures and video for each of the aspects of the compressed 3D data at the requested time t+7 before playback can begin. Otherwise, the environment presented to a viewer may have artifacts, tearing, or other unusual characteristics for at least a few frames of video.

Once the time seek 504 has found the correct time, the geometry decoder 506 and video decoder 507 may operate substantially simultaneously to decode the encoded geometry (and textures) for geometric shapes and video for the cards and skybox. The output of those decoders is the decoded volumetric video in the current field of view of the viewer.

Description of Processes

Figure 6:
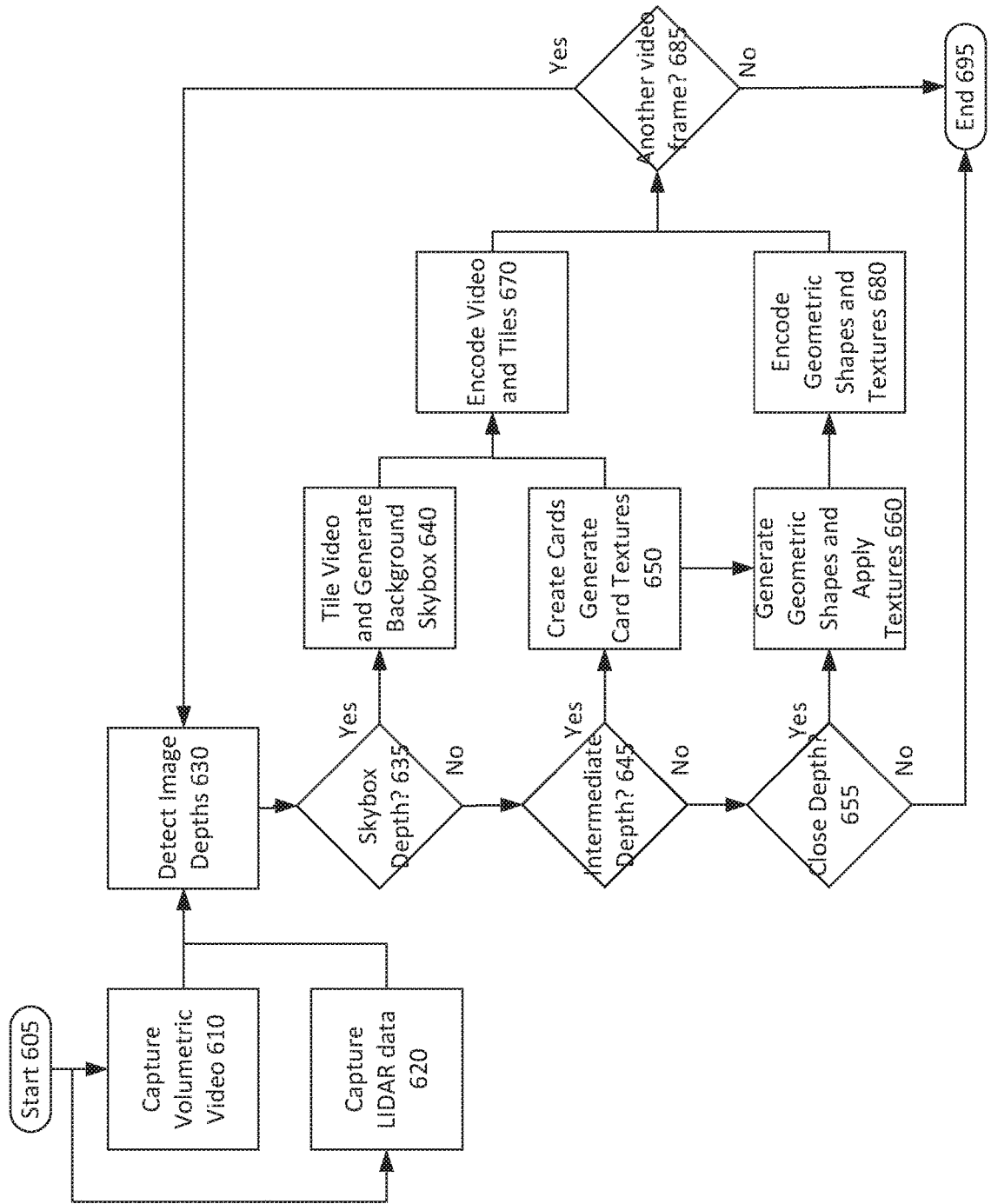
FIG. 6 is a flowchart of a method for encoding live action volumetric video.

FIG. 6 is a flowchart of a method for encoding live action volumetric video. The process begins at 605 and ends at 695, but takes place for every frame of video captured by the stereo camera and LIDAR system, like the system shown in FIG. 1, as pointed out by step 690. The process may rely upon the functional system shown in FIG. 3.

First, following the start 605, volumetric video is captured at 610. This volumetric video means a set of 360 degree images. Preferably, this volumetric video is captured using stereographic cameras so that depth data may be derived from the individual frames of video themselves. However, some embodiments may not rely upon stereographic cameras.

Substantially simultaneously, LIDAR data is captured at 620. As discussed in the related disclosures identified above, the LIDAR data may be used to provide a ground truth basis for depth data that may be used to ensure the accuracy of depth data created by stereographic images or through other methods. Though LIDAR data is shown as being captured in 620, in some cases LIDAR data may be replaced by data from some other depth-finding system.

After the images are captured at 610 and the LIDAR data is captured at 620, the image depths are detected at 630. At this step, the system creates a detailed depth of field for everything present in an entire scene from the point of view of the capture point (e.g. a camera/LIDAR rig). This is represented entirely as geometry. And, as discussed above, because the scene is large, the geometry takes up more space than is ideal. However, these detected image depths and associated geometry may be used during the encoding process to dramatically reduce the storage space and transmission bandwidth (and time) necessary for the resulting compressed 3D video.

Once the depths of each object within a scene are detected at 630, then each of the predetermined distances may be detected and acted upon in turn. Though shown in order, these determinations regarding depth may take place in any order.

The skybox depth objects are detected at 635 for every object within the captured frame. If an object is beyond a predetermined distance from the capture point, then it is identified as a "skybox" object. The predetermined depth for skybox objects may be relatively close, for example, any object greater than 22 meters from the capture point may be projected as skybox. The predetermined distance may vary depending upon computing standards, virtual reality capabilities, or other basis. The predetermined depth for skybox may be selected from any distance greater than 20 meters from the capture point for the video.

For skybox depth objects ("yes" at 635) the video captured related to that object is tiled as a background skybox at 640. As discussed above, the skybox is a spherical background image projected into the "infinite" distance at a greater than parallax distance from the viewer. So, for objects greater than the predetermined skybox distance, no geometry is captured or generated for the encoding process. Instead, these objects are represented merely as images precisely because they are at a sufficient distance from the viewer that the viewer will be unable to determine whether or not there is any geometry for that object, e.g. objects in the sky from earth typically are of such a distance that a viewer cannot detect any dimensionality to those objects. As a result, representing those objects as video backgrounds does not result in any loss of fidelity for a typical viewer.

If an object is at an "intermediate" depth, it is detected at 645. These objects are objects within approximately 7 meters to 22 meters from the capture point for the video frame. These objects are objects which are sufficiently close to a viewer at the capture point that if a complete lack of parallax were left, the viewer would notice and doing so would break the realism of the overall experience, but that are sufficiently far from the viewer that individual geometry is likely unnecessary complexity and costly in terms of space used and transmission bandwidth required. Although 7 to 22 meters is the "intermediate" range, the range may be anywhere between 5 and 22 meters, depending on available technology, the resolution of virtual reality headsets, or other technological or similar advancements.

If the object is an "intermediate" depth ("yes" at 645), then cards and card textures are generated at 650. The cards are two-dimensional projections (e.g. squares or rectangles) at a depth selected to approximate the three-dimensional object being represented by the card. The texture created is generated based upon the captured video, but superimposed on the card to create a parallax effect for the object being represented. Transparency is added to the cards in portions of the card that were not a part of the geometric object being approximated. The use of transparency saves space in the compressed file by not including actual geometry for a three-dimensional object while still providing some spatiality as a card in approximately the location within the three-dimensional space of the three-dimensional object being represented.

Finally, for those objects that are "close" objects, they are detected at 655. These are objects that are within approximately 7 meters from the capture point for the associated video. These objects are sufficiently close to a viewer that failure to accurately represent these objects in three dimensions may significantly reduce the immersion of a viewer.

For "close" objects ("yes" at 655), geometric shapes are generated and textures are generated and applied to those shapes at 660. These geometric shapes are created using the stereographic images and the LIDAR data so as to be as accurate as possible given the captured data. This process is discussed in the related disclosures identified above. The textures are derived from the video with some modifications to them to make them better-conform to objects perceived visually in reality.

For the "skybox" objects and "intermediate" objects may be encoded as video and tiles at 670. The video is derived directly from the captured video for the scene. The tiles are stitched together from the captured video. The use of skybox tiles and cards with associated video dramatically reduces the overall complexity of rendering and encoding these "skybox" and "intermediate" objects.

For the "close" objects, the geometric shapes and textures are encoded using techniques used for virtual reality or video game type geometries at 680. The textures are derived from the video as well and "wrapped" around the geometric objects. These objects are more complex, but are limited to only those objects that are "close." Therefore, they are encoded as geometric shapes because they provide a much more realistic representation of the captured space.

If there are additional frames of video ("yes" at 685), then the process begins again at the detection of image depths. If there are no additional frames of video ("no" at 685), then the process ends at 695.

Figure 7:
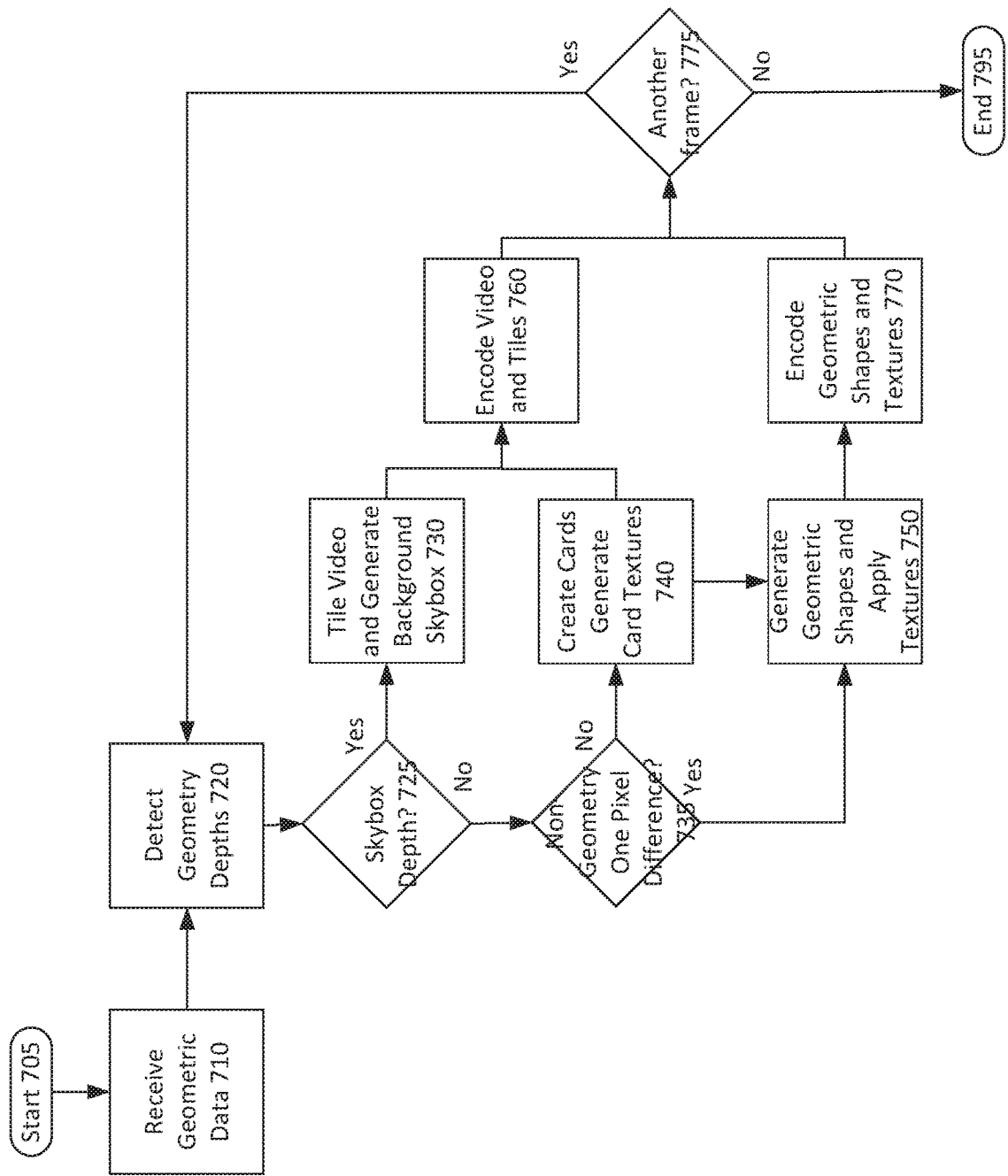
FIG. 7 is a flowchart of another method for encoding live action volumetric video.

FIG. 7 is a flowchart of another method for encoding live action volumetric video. FIG. 7 has a start 705 and an end 795, but may repeat for each frame of video (or of geometry), just as FIG. 6 did. FIG. 7 is an alternative method, with similarities to aspects described above with respect to FIG. 6. Where there are similarities, those elements will not be repeated.

FIG. 7 begins with receipt of geometric data at 710. This geometric data may or may not include any visual elements (e.g. video, stereographic video, textures, etc.). This is because the systems and methods described herein, though described with reference to the combined stereographic camera video and LIDAR data, may function equally well on any received three-dimensional geometric data whether or not it includes video or textures. The remainder of this method presumes the inclusion of video, but it is not required for the process to function.

The geometric data received at 710 may be in the form of a three-dimensional video game environment, LIDAR data, Kinect® data, a computer model, a CAD or other forms of geometric data. The primary characteristic of the received geometric data is that it is a three-dimensional model of an environment and/or one or more objects.

Once geometric data (and any video and/or textures) is received at 710, the geometric data is scanned to detect geometry depths at 720. This process may rely upon individual tessellations within the geometric data or may operate on an object-by-object basis for each object within the geometric data. This depth data is noted.

Once the depth data is known, a skybox depth determination is made at 725. Preferably, for each triangle within the geometric data, this determination is whether the depth is greater than 100 meters from a capture point or central point if the geometric data is within a fully realized three-dimensional scene. If the distance is greater than 100 meters for a given set of triangles (tessellations—"yes" at 725), then that object is encoded as skybox with video tiles and background geometry in the form of a sphere at an "infinite" distance from the viewer at 730.

If the tessellations are not skybox depth ("no" at 725), then the tessellations are considered for card encoding or geometric shape encoding. The determination is whether there would be a greater than a predetermined number of pixels difference between the geometric data and the resulting compressed (or encoded) geometric data at 735. These pixel differences generally occur when there is a combination of both closeness of the object and a higher degree of depth variability for that object. The depth variability is less-important for distant objects than for closer objects and distant objects are much less likely to result in depth variability. So, in general, the pixel differences arise on relatively close objects with some depth variability or relatively distant objects with high or extreme depth variability.

For the highest fidelity accuracy, this predetermined number of pixels difference is a single pixel meaning that if the resulting difference in the encoding is greater than a single pixel that would be a different color or in a different place under the original geometric data than would be if the encoded geometric data for that object or set of tessellations were presented as a "card," then it will not be presented as a card and will instead be encoded as geometry. In other cases in which visual fidelity is less important or in which compression is more important, tolerances of greater than a single pixel may be allowed.

In this determination at 735, the actual "distance" to the object or set of tessellations is not considered directly, as it is in the method described above. Instead, the more-distant an object is from the capture point or central point, in general, the less-likely there is to be a pixel difference between representing that object as a "card" as opposed to geometry. But, for extremely flat objects, like a poster on a wall or even a wall itself, whether or not that object is very distant from a viewer, it may be accurately represented as a "card" in some cases without even a single pixel loss at extremely close distances. Conversely, a complex geometric shape, like a tree or a moving human, even at a relatively large distance, may result in a greater than tolerable pixel difference even at relatively large distances. Those objects, despite their overall distance from the capture point or central point may still result in visually-perceivable differences from the original geometric data if they are encoded as "cards." In such cases, despite a relative or even extreme distance, those objects may be encoded as geometric shapes, rather than as "cards."

If there is no geometry difference greater than a predetermined number of pixels (e.g. one pixel difference, here— "no" at 735), then the object may be represented by a "card" and cards are generated along with associated textures at 740. This process is described in more detail above and will not be repeated here.

If there is a geometry difference greater than a predetermined number of pixels (e.g. one pixel difference, here— "yes" at 735), then the object should be represented as an encoded geometric shape and the shape and associated textures are generated at 750.

At 760, the cards and skybox video and associated tiles are created and encoded using known video encoding techniques, such as key frames and differences discussed more fully above.

At 770, the geometric shapes are encoded using techniques known for that, including the key object frames and differences discussed more fully above.

Finally, if there is another frame of geometric data (and/or video) at 775 ("yes" at 775), then the process begins again for the next frame at 720. If there is not another frame of data ("no" at 775), then the process can end.

Figure 8:
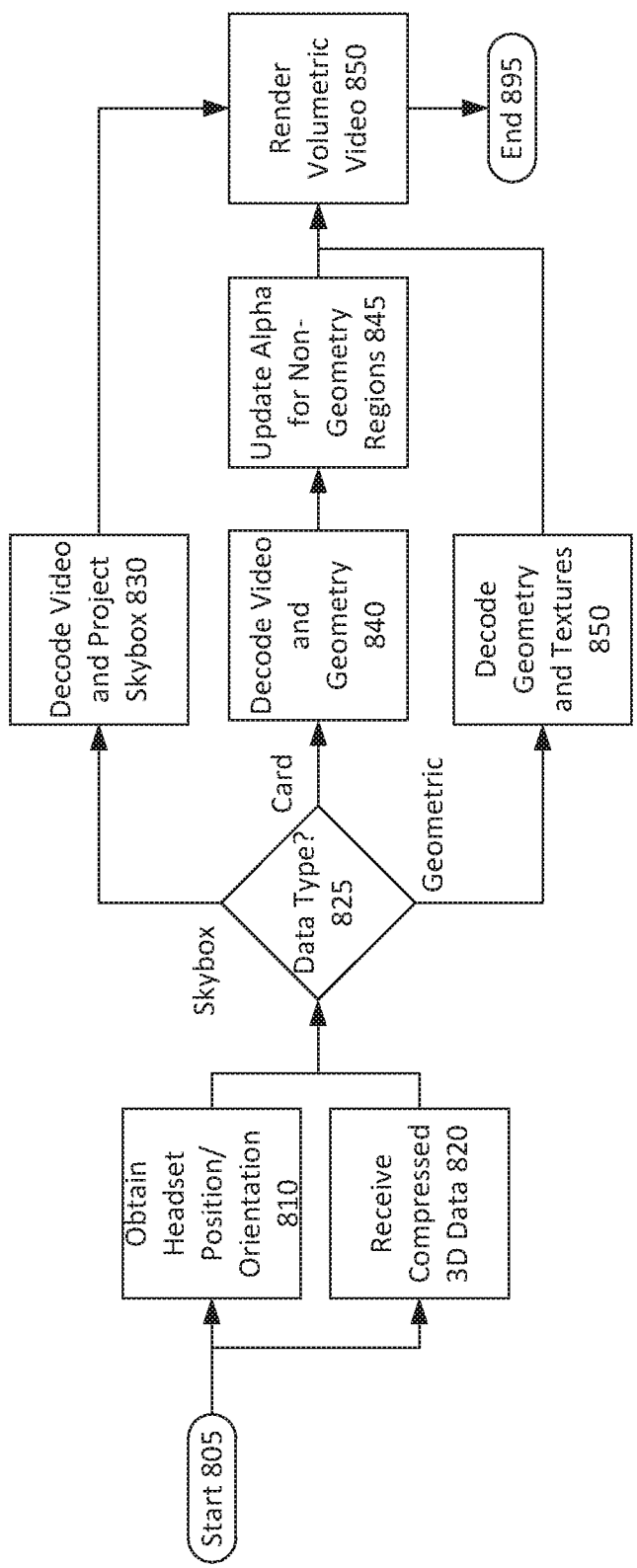
FIG. 8 is a flowchart of a method for decoding live action volumetric video.

FIG. 8 is a flowchart of a method for decoding live action volumetric video. This process, like the encoding process, has a beginning 805 and an end 895, but can take place for each frame of video just as it does for each frame of video in the encoding process. This process assumes that the appropriate portion of the live action volumetric video has already been identified or otherwise selected.

After the start of decoding at 805, the headset position and orientation are obtained at 810. The headset position and orientation are necessary because the type of data being decoded is data for a three-dimensional environment in which the wearer of the VR or AR headset is placed. So, the position and orientation is used to enable the decoder to selectively decode only the relevant view for the wearer of the VR or AR headset.

Substantially simultaneously with obtaining the headset position and orientation at 810, the compressed 3D data is received at 820. This step is shown as receiving the data because the encoding is sufficiently efficient that the present system can operate upon data that is transmitted in real-time as the decoding is taking place. So, each frame of video may be decoded as it is streamed to a viewer. However, the entire data set may also be present on a computer system before the process begins at all. So, in these situations, "receipt" of the data is merely accessing the data available on the computer or a network drive or otherwise available to the system.

Next, the data type for each object in the encoded video is determined at 825. The three possible data types are skybox, card, and geometric; corresponding to the types of data encoded in FIG. 6 or FIG. 7.

If the data is skybox data ("skybox" at 825), then the associated video is decoded and the decoded skybox video is projected as a skybox background. This sets the background for the entire scene (and for this particular frame) as the video from the scene.

If the data is card data ("card" at 825), then the associated video is decoded and the geometry (e.g. the cards size, shape, location, and distance from the capture point) is decoded. This is performed for each card in the frame based upon the headset position and orientation. The alpha (transparency) for the non-geometry regions is also updated at 745. The transparency is applied to the cards in places in which the three-dimensional object is not represented by a given card.

If the data is geometric ("geometric" at 825), then the geometry and textures are decoded to create each of the geometric objects within the field of view determined by the headset position and orientation provided at 810. The associated textures are applied to each of those geometric objects based upon the data encoded in FIG. 6 or FIG. 7.

At this point, all of the relevant data for the scene has been decoded and the volumetric video is rendered at 850. The process ends at 895, but may repeat for each frame of the video.

Figure 9:
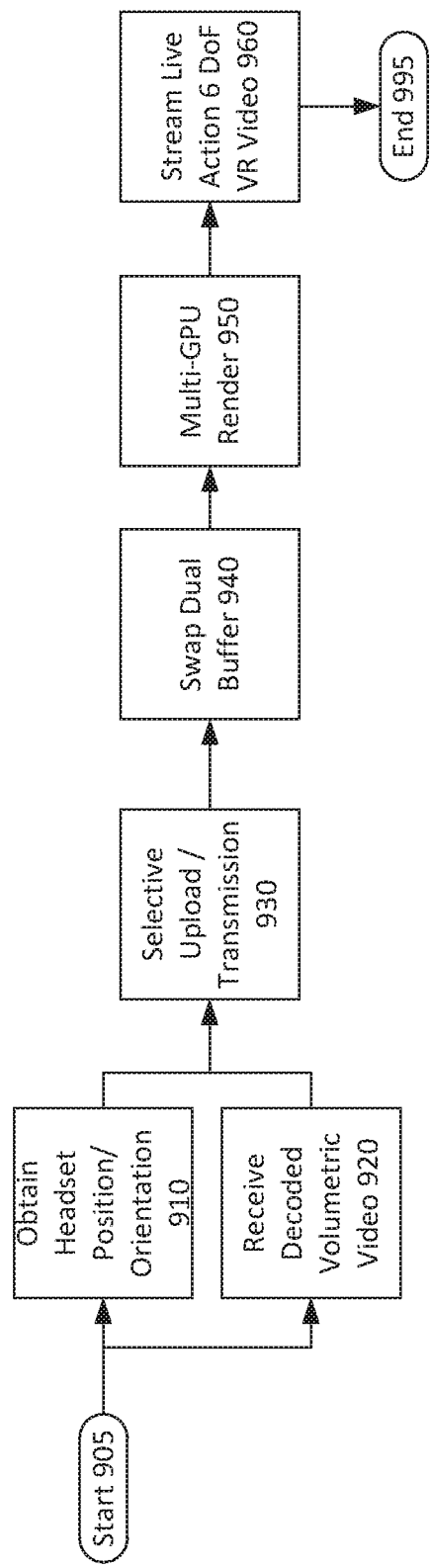
FIG. 9 is a flowchart of a method for generating live action volumetric video using a graphics engine.

FIG. 9 is a flowchart of a method for generating live action volumetric video using a graphics engine (e.g. software for rendering three-dimensional spaces for display to a viewer). In the present case, the graphics engine renders the video twice, once for each eye, showing subtle differences in perspective through the use of the dual, stereoscopic rendering. This process has a start 905 and end 995, but repeats for each frame of video to be used to generate live action volumetric video.

After the start 905, the position of headset and orientation at 910. The graphics engine uses this information to determine which portion of the overall volumetric video to render. Substantially simultaneously, the decoded volumetric video frame (FIG. 8) is received at 920.

Based upon the headset position and orientation, the data uploaded or transmitted to the graphics engine may be selectively uploaded or transmitted at 930. This selective upload or transmission saves a substantial amount of bandwidth immediately by not filling the graphics engine buffers with unnecessary data that is not within a viewer's field of view or on the edges of a viewer's field of view. Because the graphics engine operates incredibly quickly (approximately 90 frames per second rendered), as a user's head turns, the field of view can be updated sufficiently quickly that changes in headset orientation or position may be addressed by the graphics engine.

The graphics engine also relies upon a dual buffer swap operation at 940. Specifically, the graphics engine utilizes two buffers to enable operation of the decoding and transferring simultaneously with the rendering cycle of the graphics engine. One buffer may be filled with the next frame of video being decoded by the decoder while the other buffer may be being rendered by the graphics engine based upon the last frame decoded by the decoder. Once both operations complete, the buffers are swapped, so that the just-rendered video frame buffer may begin being filled with the next video frame being decoded while the graphics engine renders the just-decoded video frame. If decoding takes longer than rendering, then rendered frames may be used twice in a row to maintain a high frames per second (FPS) output.

The transmission bandwidth required to maintain approximately 90 frames per second is between 15 and 30 Megabits per second. While high, this is well within reasonable bandwidth over a local area network and over standard video connections such as HDMI or DisplayPort or Lightening cables.

The system may also rely upon multiple graphics processing units (GPUs) to perform the rendering. GPUs generally are better-suited for operations upon video and geometric data because they include special instruction sets, cache, and high-speed memory for working upon video data and large data sets in general. The rendering process using multiple GPUs typically divides up the rendering process across multiple graphics processing units by processing only certain aspects of a given frame of decoded video. The use of multiple GPUs increases the speed of the render.

Once a given frame is rendered at 950, then the live action six degrees of freedom virtual reality video 960 is streamed or otherwise output. The process may repeat so long as additional frames of video are available to be rendered. Once all available video rendering is completed, the process ends at 995.

Figure 10:
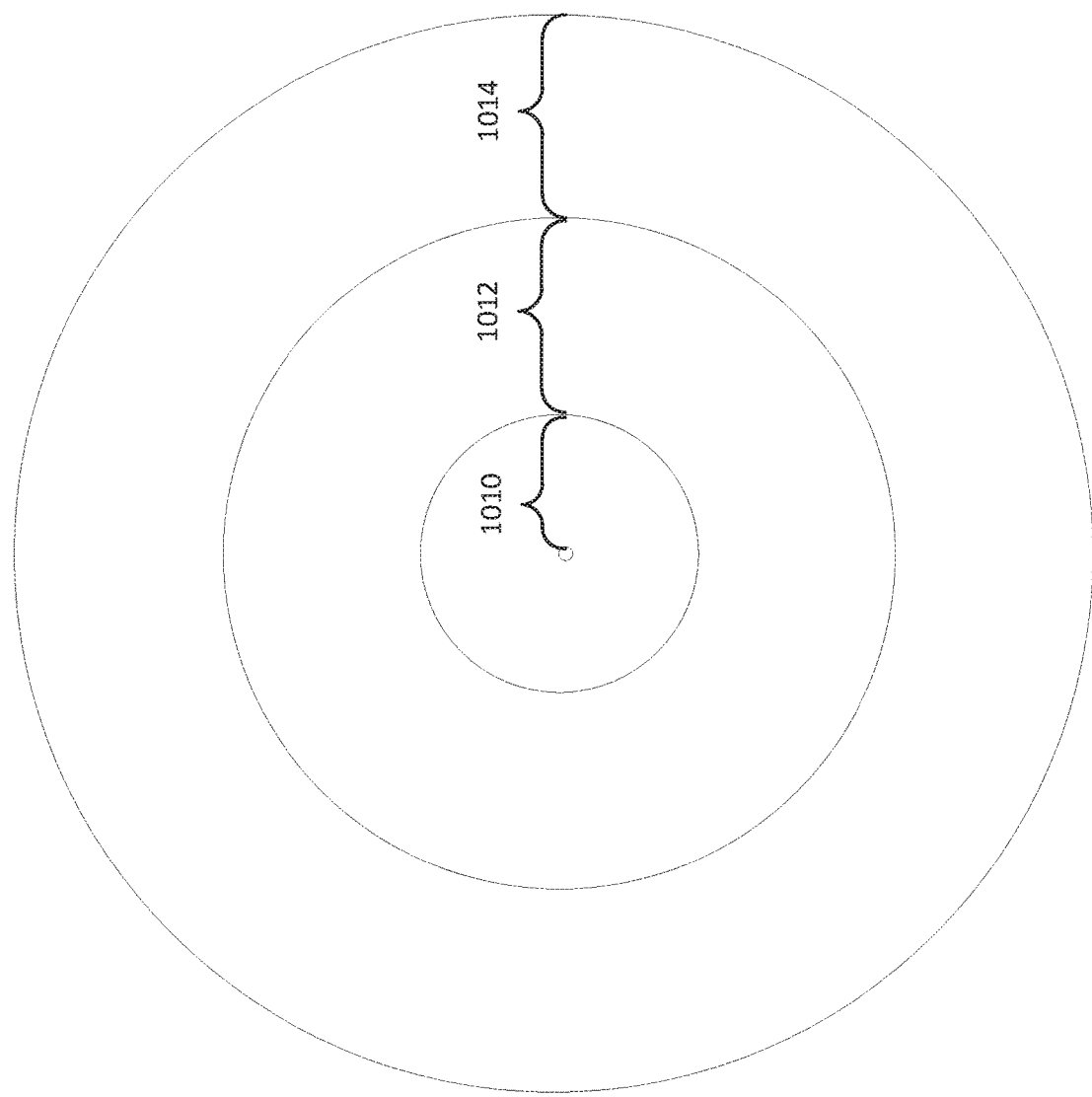
FIG. 10 is an example three-dimensional environment.

FIG. 10 is an example three-dimensional environment. The "close" distance 1010 from the capture point 905 may be seen along with the "intermediate" distance 1012 and the "skybox" distance 1014.

Figure 11:
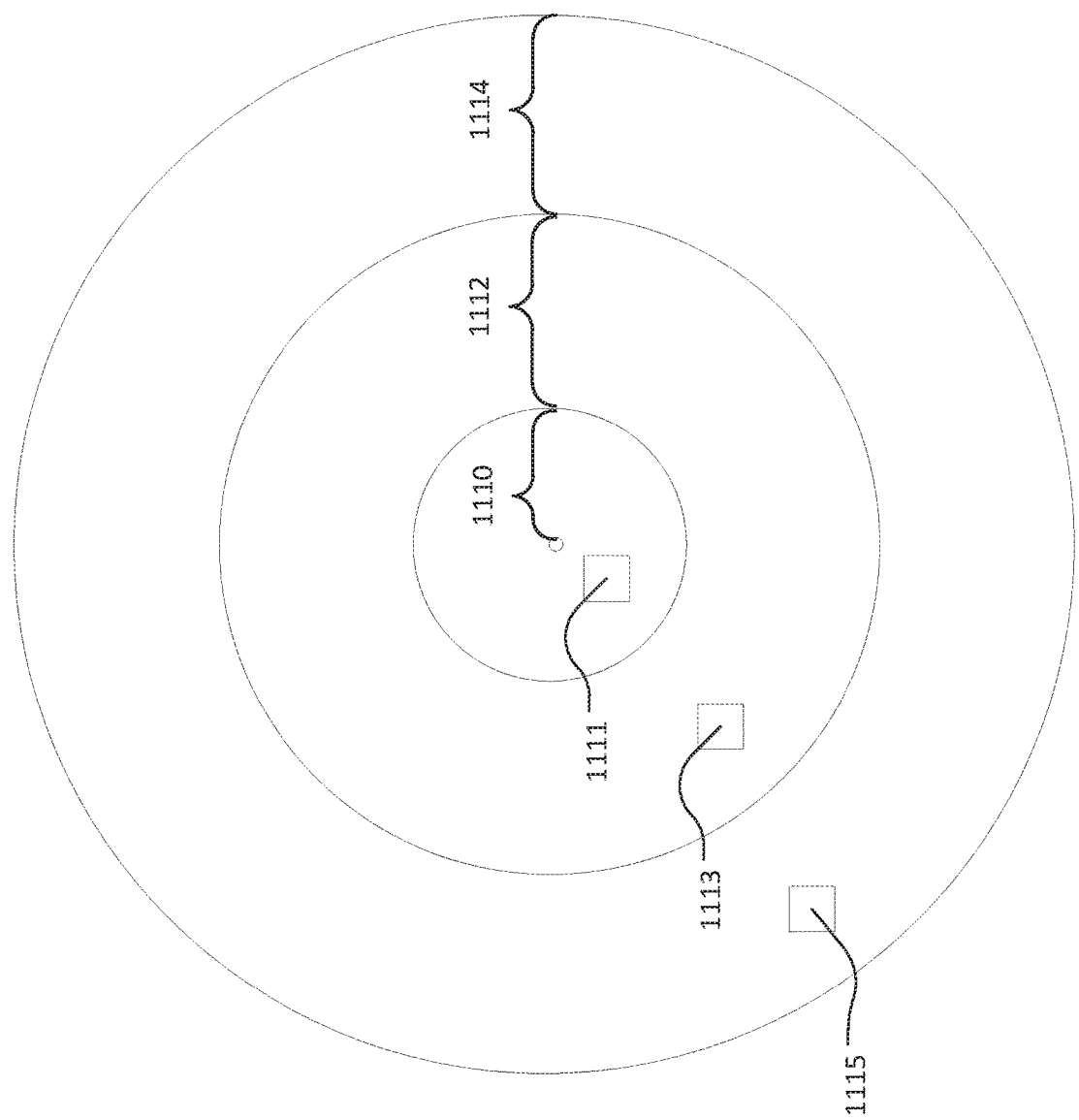
FIG. 11 is an example three-dimensional environment including three three-dimensional objects.

FIG. 11 is an example three-dimensional environment including three three-dimensional objects. The "close" distance 1110, "intermediate" distance, and "skybox" distance 1114 are the same as in FIG. 10, but now there are three objects, one within each distance. The "close" object 1111 is within the "close" distance 1110. The "intermediate" object 1113 is within the "intermediate" distance 1112 and the "skybox" object 1115 is within the "skybox" distance 1114.

Each of these objects 1111, 1113, and 1115 is, when captured, a three-dimensional object of irregular size and shape.

Figure 12:
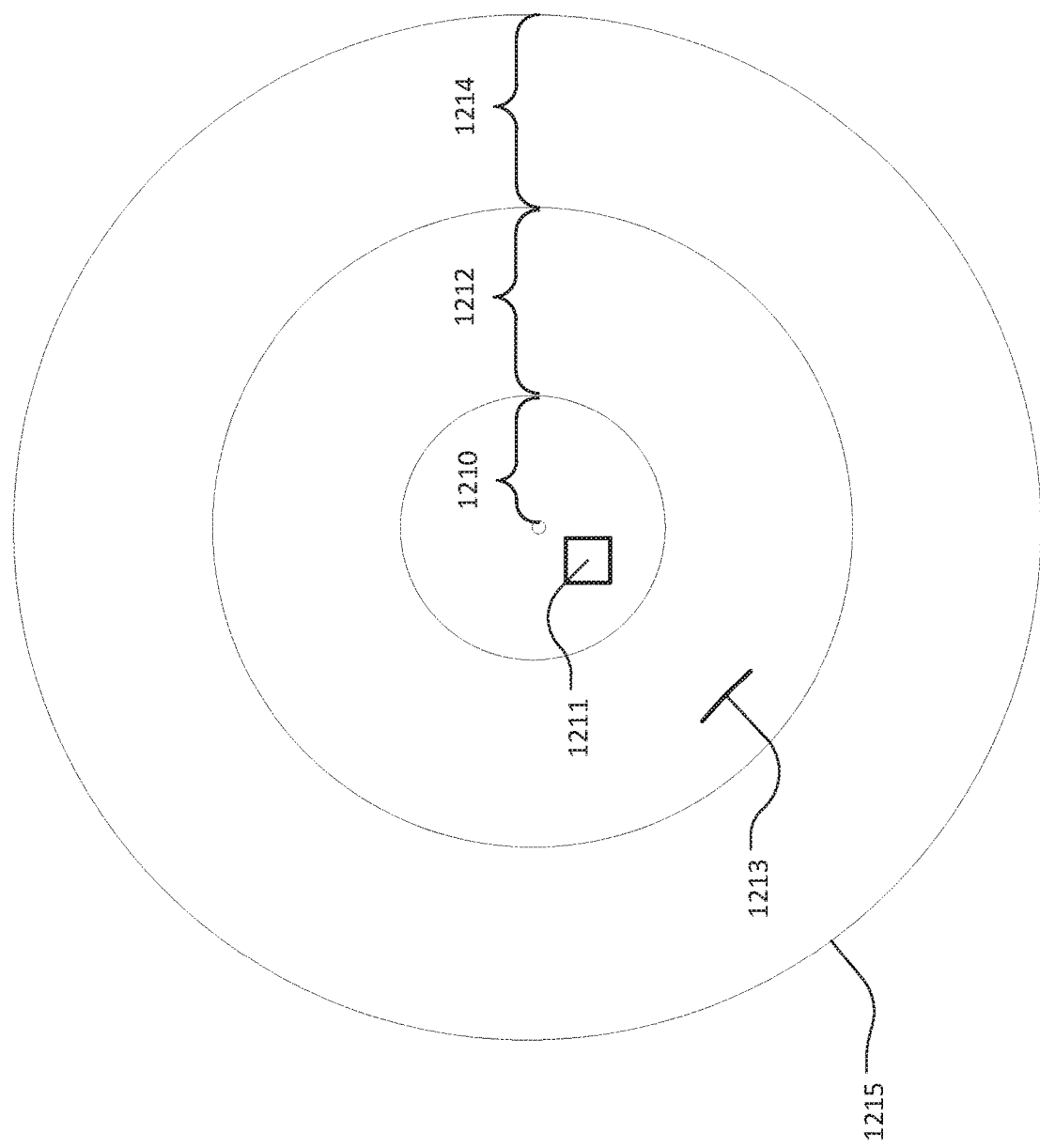
FIG. 12 is an example rendered three-dimensional environment including three encoded objects as presented by a graphics engine.

FIG. 12 is an example rendered three-dimensional environment including three encoded objects as presented by a graphics engine. This shows an example of the same environment from FIG. 11, but in rendered form following the encoding, decoding, and rendering by the systems and methods described herein.

The "close" object 1211 is rendered fully in three dimensions. The view is a top-down simplified view, but representation of the "close" object 1211 as a square corresponding to the square "close" object 1111 shown in reality in FIG. 11.

The "intermediate" object 1213 is rendered instead as a "card." This is represented in FIG. 12 by a line, rather than a square, representative of the square, three-dimensional "intermediate" object 1113 of FIG. 11. This "intermediate" object 1213 is a two-dimensional representation of a three-dimensional object in the actual scene as it is captured. It is presented at an approximate location where the three-dimensional object was detected.

Finally, the "skybox" object 1215 is represented as a part of the skybox itself, rather than having any two- or three-dimensionality at all. Though the "skybox" object in FIG. 11 had three dimensions, it is within the "skybox" distance 1214 and, therefore, when it is encoded, it is melded with the "skybox" itself simply as a texture added to the "skybox" background for the scene.

Though shown as distinct regions in conformity with the description of the encoding process described in FIG. 6, the objects 1111, 1113, and 1115 may likewise conform to the relative complexity depth combined with the depth variability as described in FIG. 7. For the "close" object 1211, geometry is necessary because there are dramatic differences in pixels between the pre-encoding and post-encoding version of the object without representation of the object as a geometric shape. Likewise, the "intermediate" object may be presented as a card because its combination of depth variability and distance results in no variation in pixels between the pre-encoding and post-encoding version of the object. Finally, the "skybox" object 1215 is so distant with so little depth variability that it may simply be melded into the background or it is at a distance greater than 100 meters and is, effectively, a part of the "skybox" regardless.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for compressing geometric data and video comprising:
   receiving geometric data and video for a physical location;
   generating a background video from the video;
   generating background geometric data for the geometric data outside of a predetermined distance from a capture point for the video as a skybox sphere at a non-parallax distance;
   generating a three-dimensional geometric shape for a first detected object within the predetermined distance from the capture point from the geometric data;
   generating shape textures for the geometric shape from the video;
   generating two-dimensional video for a second detected object, less than the entirety of the geometric data, the second detected object having three dimensions, within the geometric data at a distance between the predetermined distance and a second predetermined distance;
   generating a two-dimensional object at an approximation of the distance from the capture point of the second detected object; and
   encoding the background video, the two-dimensional video, and shape textures as compressed video along with the geometric shape, the two-dimensional object, and the background geometric data as encoded volumetric video.

2. The method of claim 1 further comprising detecting edges for the second detected object represented by the two-dimensional object and applying transparency to regions of the two-dimensional object not a part of the second detected object.

3. The method of claim 2 wherein the two-dimensional object includes only four sides, with matching pairs of sides in parallel with one another.

4. The method of claim 1 further comprising replacing the two-dimensional video and the two-dimensional object with a second geometric shape and associated shape textures when the two-dimensional object, when rendered, results in more than a one-pixel difference between the second detected object within the geometric data and the two-dimensional object within the compressed volumetric video.

5. The method of claim 1 wherein the predetermined distance is between 5 to 10 meters.

6. The method of claim 1 wherein the second predetermined distance is between 10 to 20 meters.

7. The method of claim 1 further comprising:
   decoding the background video and the textures from the encoded volumetric video, the geometric shape, and background geometric data;
   applying the background video to the background geometric data to thereby generate a skybox background and associated skybox video; and
   applying the shape textures to the geometric shape to create a three-dimensional object incorporating the shape textures.

8. A system for compressing geometric data and video comprising:
   a camera rig for capturing video and associated geometric data for a physical location;
   a processor for:
      generating a background video from the video;
      generating background geometric data for the geometric data outside of a predetermined distance from a capture point for the video as a skybox sphere at a non-parallax distance;
      generating a three-dimensional geometric shape for a first detected object within the predetermined distance from the capture point from the geometric data;
      generating shape textures for the geometric shape from the video;
      generating two-dimensional video for a second detected object, less than the entirety of the geometric data, the second detected object having three-dimensions, within the geometric data at a distance between the predetermined distance and a second predetermined distance;
      generating a two-dimensional object at an approximation of the distance from the capture point of the second detected object between the predetermined distance and the second predetermined distance; and
      encoding the background video, the two-dimensional video, and shape textures as compressed video along with the geometric shape, the two-dimensional object, and the background geometric data as encoded volumetric video.

9. The system of claim 8 wherein the processor is further for detecting edges for the second detected object and applying transparency to regions of the two-dimensional object not a part of the detected object.

10. The system of claim 9 wherein the two-dimensional object includes only four sides, with matching pairs of sides in parallel with one another.

11. The system of claim 8 wherein the processor is further for replacing the two-dimensional video and the two-dimensional object with a second geometric shape and associated shape textures when the two-dimensional object, when rendered, results in more than a one-pixel difference between the second detected object within the geometric data and the two-dimensional object within the compressed volumetric video.

12. The system of claim 8 wherein the predetermined distance is between 5 to 10 meters.

13. The system of claim 8 wherein the second predetermined distance is between 10 to 20 meters.

14. The system of claim 8 further comprising a second processor for:
   decoding the background video and the textures from the encoded volumetric video, the nearby geometric shape, and background geometric data;
   applying the background video to the background geometric data to thereby generate a skybox background and associated skybox video; and applying the shape textures to the geometric shape to create a three-dimensional object incorporating the shape textures.

15. A method for compressing geometric data comprising:
receiving geometric data defining a physical location;
generating background geometric data for the geometric data outside of a predetermined distance from a central point geometric data as a projection at a non-parallax distance;
generating a three-dimensional geometric shape for a first detected object within the geometric data, when representation of that first detected object as a two-dimensional object would result in greater than a predetermined pixel difference between the geometric data and compressed geometric data;
generating a two-dimensional object at an approximation of a distance from the capture point of a second detected object, less than the entirety of the geometric data, between the predetermined distance and the capture point, when representation of the second detected object as a two-dimensional object would not result in a loss of greater than a predetermined pixel difference between the geometric data and the compressed geometric data; and
encoding the geometric shape, the two-dimensional object, and the background geometric data as the compressed geometric data.

16. The method of claim 15 further comprising detecting edges for the detected object represented by the two-dimensional object and applying transparency to regions of the two-dimensional object not a part of the detected object.

17. The system of claim 16 wherein the two-dimensional object includes only four sides, with matching pairs of sides in parallel with one another.

18. The method of claim 15 further comprising replacing the two-dimensional object with a second geometric shape when the two-dimensional object, when rendered, results in more than a one-pixel difference between the second detected object within the geometric data and the two-dimensional object within the compressed geometric data.

* * * * *